Patented Apr. 30, 1946

2,399,597

UNITED STATES PATENT OFFICE 2,399,597

ANTHELMINTHIC

William R. Jones, Oakland, Calif., and Howard A. Jones, Orlando, Fla., assignors to The United States of America as represented by the Secretary of Agriculture No Drawing. Application October 2, 1945, Serial No. 619,915

2 Claims. (Cl. 260—631.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to an anthelminthic or vermicide, and has for its principal object the provision of a simple, effective, and safe therapeutic material suitable for the removal of helminths from animals.

We have found that the product, which we prepare by the process herein disclosed, is safe and highly effective for the removal of helminths. In general, the product is prepared by treating oil of rose geranium with calcium chloride to precipitate geraniol, the liquid being removed therefrom by filtering; treating the removed liquid with phthalic anhydride to form the acid phthalates of the primary alcohols present in the liquid; dissolving the acid phthalates in sodium carbonate; treating the sodium carbonate solution of acid phthalates with potassium hydroxide to saponify the phthalates; removing the liberated alcohols and other products from the saponified phthalates by steam distillation; and fractionally distilling the final product from the steam distillate under reduced pressure.

The following specific example is given to exhibit the process in greater detail:

Oil of rose geranium (domestic) in the amount of 2.7 liters was divided into 12 substantially equal lots, each of which was diluted with 500 cc. of hexane, and was then treated by shaking for 6 hours with a quantity of calcium chloride equal in weight to that of the oil used. The precipitate which had formed and the excess unchanged calcium chloride were removed by filtering the clear supernatant liquid therefrom, and were discarded. The filtrates from all lots were combined and the hexane was recovered on the steam bath. During recovery of the hexane a precipitate formed and the clear liquid was removed therefrom.

The resulting clear liquid was then treated with 2 kg. of phthalic anhydride, an excess of the amount required, dissolved in 2 liters of benzene and was refluxed on the steam bath for one and one-half hours to form the acid phthalates of the alcohols present in the clear liquid. This mixture was allowed to stand several hours and the benzene was recovered on the steam bath under reduced pressure. In order to remove the excess phthalic anhydride six liters of ether was well mixed with the residue and the mixture allowed to stand several days in the refrigerator. The clear supernatant ether solution of the acid phthalates was then decanted from the separated excess phthalic anhydride remaining as a sludge. The sludge was centrifuged and washed with ether. The clear ether solution obtained from the centrifuging and wash was combined with the clear ether solution obtained by the decanting.

The acid phthalates were then removed from the ether solution of acid phthalates by treating it (in about 2 liter batches) with 5 per cent sodium carbonate, the sodium carbonate solution of the acid phthalates separating in layers which were removed from the ether by decanting. Successive lots of the sodium carbonate were used until the layers were no longer colored. Each lot of sodium carbonate solution of the acid phthalates thus obtained was washed with 2 lots of ether.

The resulting 15 liters of sodium carbonate solution of acid phthalates was divided into three lots, each of which was treated with 670 g. of potassium hydroxide dissolved in 1 liter of water and subjected to steam distillation. The phthalates were thus saponified and the resulting alcohols and other products were removed from the saponified phthalates by the distillation.

A total of about 670 cc. of steam distillate was obtained from the three lots. This was dried over sodium sulfate and was then fractionally distilled under reduced pressure, the first small fraction being discarded and the product distilling at 111° to 117° C. at 12 mm. being collected.

This final collected product, representing a yield of 578 g., is the anthelminthic or vermicide product of this invention. It has a boiling point of from 111° to 117° C., at a pressure of 12 mm.; a density of 0.8609 g. per cc. at 25° C.; a refractive index $(N)_D^{25°}$ of 1.4557; and an optical rotation $(alpha)_D^{20°}$ of 0°.

In tests made, the product, in doses varying from 1 to 25 cc. per dog, removed 100 percent of 46 ascarids from 10 dogs, 97 percent of 400 hookworms from 12 dogs, and 40 percent of 708 whipworms from 7 dogs.

A satisfactory procedure for the treatment of dogs for removal of helminths is to fast the animal for 18 hours, and administer the product at the dose rate of 0.5 cc. per pound of body weight. To carry the drug to the habitat of the parasites, the medium of hard gelatin capsules given per os may be employed. The treatment may be followed in some cases in from one and one-half to two hours with one ounce of castor oil.

The material of this invention is a suitable substitute anthelminthic for the chlorinated hydrocarbons (carbon tetrachloride, tetrachloroethylene, n-butyl chloride, etc.).

Having thus described the invention, what is claimed is:

1. A product having anthelminthic properties resulting from the process comprising treating a solution of oil of rose geranium and hexane with calcium chloride, removing the liquid from the resulting precipitate, treating the removed liquid with phthalic anhydride to form the acid phthalates of the alcohols present in the liquid, dissolving the acid phthalates in sodium carbonate, treating the sodium carbonate solution of acid phthalates with potassium hydroxide to saponify the phthalates, removing the liberated alcohols and other products from the saponified phthalates, and fractionally distilling the liberated alcohols and other products, collecting that part of the distillate which distills at 111° to 117° C. at 12 mm.

2. A product having anthelminthic properties resulting from the process comprising treating oil of rose geranium diluted with hexane with calcium chloride to precipitate geraniol, removing the resulting hexane diluted liquid from the precipitate, recovering the hexane therefrom, treating the resulting clear liquid with an excess of phthalic anhydride dissolved in benzene to form the acid phthalates of the alcohols present in the clear liquid, recovering the benzene therefrom, treating the remaining liquid with ether to cause separation of the excess phthalic anhydride and to form an ether solution of the acid phthalates, removing the ether solution of the acid phthalates from the excess phthalic anhydride, treating the ether solution of the acid phthalates with sodium carbonate to form a sodium carbonate solution of the acid phthalates, removing the sodium carbonate solution of acid phthalates from the ether, treating the sodium carbonate solution of acid phthalates with potassium hydroxide to saponify the acid phthalates, removing the resulting alcohols and other products from the saponified phthalates, and fractionally distilling the removed products, collecting that part of the distillate which distills at 111° to 117° C. at 12 mm.

WILLIAM R. JONES.
HOWARD A. JONES.